United States Patent
Shibuya et al.

(10) Patent No.: US 9,530,437 B2
(45) Date of Patent: Dec. 27, 2016

(54) MAGNETIC HEAD, HEAD GIMBAL ASSEMBLY, AND MAGNETIC RECORDING AND REPRODUCING APPARATUS

(71) Applicant: TDK CORPORATION, Tokyo (JP)

(72) Inventors: Tomohiko Shibuya, Tokyo (JP); Atsushi Ajioka, Tokyo (JP); Sadaharu Yoneda, Tokyo (JP); Atsushi Tsumita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/847,716

(22) Filed: Sep. 8, 2015

(65) Prior Publication Data

US 2016/0093318 A1    Mar. 31, 2016

(30) Foreign Application Priority Data

Sep. 29, 2014    (JP) .................................. 2014-198306

(51) Int. Cl.
  *G11B 5/02* (2006.01)
  *G11B 5/31* (2006.01)
  *G11B 5/48* (2006.01)
  *G11B 5/00* (2006.01)

(52) U.S. Cl.
  CPC .............. *G11B 5/02* (2013.01); *G11B 5/314* (2013.01); *G11B 5/4853* (2013.01); *G11B 2005/0024* (2013.01)

(58) Field of Classification Search
  None
  See application file for complete search history.

(56) References Cited

U.S. PATENT DOCUMENTS

| 4,479,100 A  * | 10/1984 | Moghe .................. H03H 7/383 333/246 |
| 5,638,287 A  * | 6/1997  | Appel ..................... H01P 5/12 333/4 |
| 6,603,623 B1 * | 8/2003  | Fontana, Jr. ........... G11B 5/012 360/123.36 |
| 8,462,465 B1   | 6/2013  | Adachi et al. |
| 2009/0153261 A1* | 6/2009 | Rofougaran ...... H01L 23/49822 333/33 |

(Continued)

FOREIGN PATENT DOCUMENTS

| FR | EP 1056200 A1 * | 11/2000 | ............... H03H 7/38 |
| FR | EP 2675064 A1 * | 12/2013 | ........ H01J 37/32183 |

(Continued)

*Primary Examiner* — Will J Klimowicz
(74) *Attorney, Agent, or Firm* — Oliff PLC

(57) ABSTRACT

A magnetic head has a magnetic head slider that includes a recording element that generates a recording signal magnetic field, a microwave magnetic field generating element that generates a microwave magnetic field, a terminal electrode, and a first transmission line that interconnects the terminal electrode and the microwave magnetic field generating element. A second transmission line is connected to the terminal electrode, the second transmission line being used to transmit a microwave signal from the outside of the magnetic head slider to the magnetic head slider. A capacitor connected to the first transmission line is provided between the terminal electrode and the microwave magnetic field generating element. Accordingly, in the magnetic head, a microwave signal is efficiently propagated.

8 Claims, 14 Drawing Sheets

(56) References Cited

U.S. PATENT DOCUMENTS

2011/0090602 A1  4/2011 Nishiyama et al.
2013/0258527 A1  10/2013 Soeno et al.

FOREIGN PATENT DOCUMENTS

| GB | 851052 A | * | 10/1960 | ............... G11B 5/00 |
| JP | 2010-073297 A | | 4/2010 | |
| JP | 2010268113 A | * | 11/2010 | |
| JP | 2013-206476 A | | 10/2013 | |

* cited by examiner

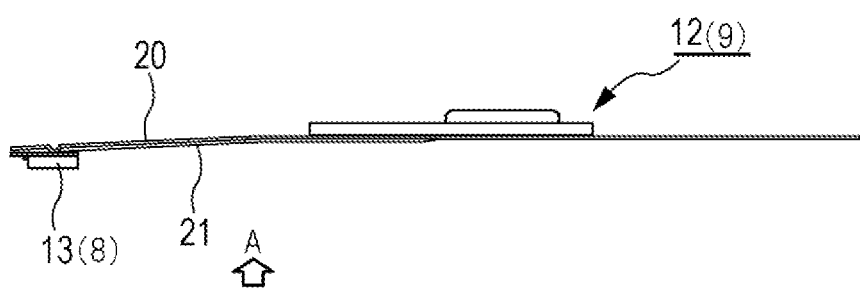

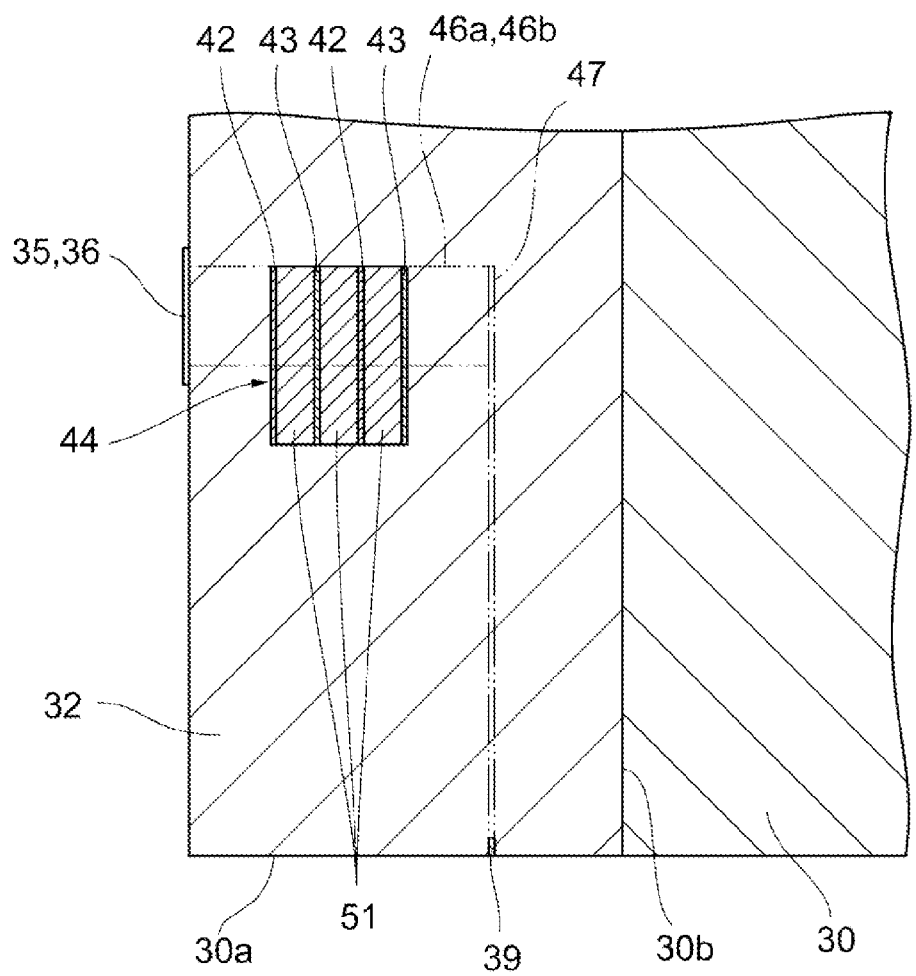

MAGNETIC HEAD, HEAD GIMBAL ASSEMBLY, AND MAGNETIC RECORDING AND REPRODUCING APPARATUS

BACKGROUND OF THE INVENTION

1. Field of the Invention

The present invention relates to a magnetic head, head gimbal assembly and magnetic recording and reproducing apparatus, and more particularly to a magnetic head, head gimbal assembly, and magnetic recording and reproducing apparatus in a microwave assisted recording method.

2. Description of the Related Art

As the recording densities of magnetic recording and reproducing apparatuses typified by magnetic disk drives have been increased, there has been a demand to further improve the performance and properties of magnetic heads and magnetic recording media. As magnetic heads, combined-type magnetic heads are widely used, in which a magneto-resistive (MR) effect element, which is a reproducing element that reads out a data signal, and an electromagnetic coil element, which is a recording element that writes a data signal, are laminated. At present, in heads of this type, attempts are being made to downsize these two elements by micromachining and to improve their properties by using new materials.

The recording layer of the magnetic recording medium is an aggregation of magnetic particles. Generally, a single recording bit is formed with a plurality of magnetic particles. To increase the recording density by reducing magnetic fluctuation on a boundary between recording bits, an attempt has been made to downsize magnetic particles. When magnetic particles are downsized, however, heat fluctuation in magnetization in the magnetic particle is increased as its volume is decreased; this is problematic in that thermal stability in magnetization is lowered.

As one solution to this problem, a change from the intra-plane magnetic recording method to the perpendicular magnetic recording method has been studied; in practice, commercialization has been achieved. With media for use in the perpendicular magnetic recording method, even if magnetic particles are downsized, more heat fluctuation can be easily suppressed by, for example, assuring a certain recording layer thickness, when compared with media for use in longitudinal magnetic recording. Thus, the surface recording density can be substantially improved.

To further improve the recording density, however, it is demanded to further downsize magnetic particles included in the recording layer of the magnetic recording medium for use in perpendicular magnetic recording with and to reliably suppress heat fluctuation. A possible approach to meet this demand is to increase the magnetic anisotropy energy $K_U$ of the magnetic particle. If the magnetic anisotropy energy $K_U$ is increased, however, the coercive force of the recording layer is increased. In practice, the coercive force of a recording layer with heat fluctuation suppressed is, for example, 5 kOe (400 kA/m) or more. By contrast, a magnetic field strength for writing with a magnetic head is substantially determined from the saturation flux density of the soft magnetic material with which magnetic poles in the magnetic head are formed. Therefore, it is very difficult to perform saturation magnetic recording, which is generally assumed to need a write magnetic field with an intensity that is about twice the coercive force.

As a further solution, energy assisted recording is proposed, in which a recording layer with a large coercive force (large magnetic anisotropy energy $K_U$) and the recording of a signal in a recording layer (the reversal of magnetic particle magnetization) is assisted by giving auxiliary energy to the recording layer during recording to lower the effective coercive force. The recording method in which a microwave magnetic field is used as an assisting energy source is referred to as microwave assisted magnetic recording (MAMR).

In microwave assisted magnetic recording, a self oscillating microwave assisted magnetic recording method and an externally oscillated microwave assisted magnetic recording method are known. In the self oscillating microwave assisted magnetic recording method, a microwave magnetic field is generated with a microwave oscillator placed in the vicinity of the recording element of a magnetic head. In the externally oscillated microwave assisted magnetic recording method, a microwave magnetic field is generated by supplying a microwave exciting current from a microwave signal generating circuit, which is provided independently of a thin-film magnetic head, to a microwave magnetic field generating element placed in the vicinity of a recording element. The externally oscillated microwave assisted magnetic recording method needs a microwave transmission path, through which the microwave exciting current is supplied to the microwave magnetic field generating element, to be provided on a suspension or on the microwave magnetic field generating element forming plane of a head slider.

To efficiently supply a microwave exciting current to a microwave generating element (microwave magnetic field generating element), Japanese Unexamined Patent Application Publication No. 2013-206476 proposes a thin-film magnetic head that can generate a certain microwave magnetic field strength with limited electric power by optimizing wires, in a magnetic head slider, that are connected to the microwave magnetic field generating element. This thin-film magnetic head is characterized in that the microwave magnetic field generating element is almost in a short-circuited end state, so a microwave signal can be efficiently supplied to the microwave magnetic field generating element and a microwave magnetic field can be thereby generated.

As described in Japanese Unexamined Patent Application Publication No. 2010-73297, to improve a transmission loss in a microwave signal, a microwave transmission line provided on a suspension is proposed. The characteristic impedance of the microwave transmission line is controlled depending on a positional relationship between shields disposed at the upper and lower portions of the microwave transmission line and conductive columns that mutually connect these shields, so a microwave signal can be efficiently transmitted.

SUMMARY OF THE INVENTION

To achieve effective microwave assisted magnetic recording, a certain microwave magnetic field is needed. To efficiently generate a certain microwave magnetic field, it is necessary to efficiently supply a microwave exciting current to a microwave magnetic field generating element.

Japanese Unexamined Patent Application Publication No. 2013-206476 proposes optimization of a transmission line formed in a magnetic head slider to pass a microwave exciting current. Japanese Unexamined Patent Application Publication No. 2010-73297 proposes improvement of the characteristics of a transmission line formed on a suspension to pass a microwave exciting current. When these proposals were only combined, a reflection loss occurred due to a mismatch in impedance between the characteristic impedance of the microwave transmission line on the suspension and the characteristic impedance of the microwave transmission line in the magnetic head slider including the microwave magnetic field generating element. Therefore, a microwave exciting current could not be efficiently supplied to the microwave magnetic field generating element.

To form a microwave magnetic field generating element in a magnetic head slider, fine conductive lines are usually used, so the physical resistive component of the microwave magnetic field generating element is very small. Therefore, a mismatch is likely to occur between the characteristic impedance obtained when the microwave magnetic field generating element side is viewed from the terminal electrode of the magnetic head slider and the characteristic impedance obtained when the second transmission line side in the suspension is viewed from the terminal electrode.

The present invention addresses the above problem with an object of providing a magnetic head that enables a microwave signal to be efficiently propagated. Another object of the present invention is to provide a head gimbal assembly and a magnetic recording and reproducing apparatus that include the magnetic head.

The above objects are achieved by the following means.

As a first feature, a magnetic head according to the present invention that achieves the above objects includes a magnetic head slider that comprises a recording element that generates a recording signal magnetic field, a microwave magnetic field generating element that generates a microwave magnetic field, a terminal electrode, and a first transmission line that interconnects the terminal electrode and the microwave magnetic field generating element; a second transmission line is connected to the terminal electrode, the second transmission line being used to transmit a microwave signal from an outside of the magnetic head slider to the magnetic head slider; and a capacitor connected to the first transmission line is provided between the terminal electrode and the microwave magnetic field generating element.

According to the present invention having the above feature, since the capacitor connected to the first transmission line is included between the terminal electrode and the microwave magnetic field generating element, a matching circuit is formed in the magnetic head slider, so a match in impedance can be made between the characteristic impedance obtained when the microwave magnetic field generating element side is viewed from the terminal electrode of the magnetic head slider and the characteristic impedance obtained when the second transmission line side in the suspension is viewed from the terminal electrode.

Thus, it is possible to suppress a microwave signal entered from the second transmission line from being reflected on the terminal electrode of the magnetic head slider, so the microwave signal can be efficiently propagated to the microwave magnetic field generating element.

As a second feature, in the magnetic head according to the present invention, each of the first transmission line and the second transmission line is a transmission line for use for a differential signal.

According to the present invention having the above feature, the characteristic impedances of the first transmission line and second transmission line are less likely to be affected by the outside of the transmission lines.

As a third feature, in the magnetic head according to the present invention, the capacitor is connected to the first transmission line in parallel to the microwave magnetic field generating element.

According to the present invention having the above feature, the capacitor connected in parallel to the microwave magnetic field generating element does not generate a capacitive component that cancels the inductive component of the first transmission line, so it is possible to further downsize the capacitor connected in parallel to the microwave magnetic field generating element.

As a fourth feature, in the magnetic head according to the present invention, the first transmission line has an inductive component.

According to the present invention having the above feature, there is no need to add another element having an inductive component to the interior of a matching circuit, so the matching circuit can be downsized. This enables the matching circuit to be easily formed in the magnetic head slider with a limited size.

As a fifth feature, in the magnetic head according to the present invention, the first transmission line has two first lines that extend from the element forming plane of the magnetic head slider in a lamination direction and the capacitor is formed with a first flat plate-like conductor connected to one of the first lines, a second flat plate-like conductor connected to the other of the first lines, and a dielectric body disposed between the first flat plate-like conductor and the second flat plate-like conductor.

According to the present invention having the above feature, the capacitor defined between the first flat plate-like conductor and the second flat plate-like conductor can be easily formed in the magnetic head slider with a limited size.

As a sixth feature, in the magnetic head according to the present invention, at least one of the first flat plate-like conductor and the second flat plate-like conductor is connected directly to the relevant first line.

If another transmission line different from the first line is provided to add an element having a capacitive component, a parasitic inductive component that cancels the capacitive component is generated, so an element having a large capacitive component is needed. This enlarges an element having a capacitive component and thereby enlarges the matching circuit. However, the present invention having the above feature enables the matching circuit to have a capacitive component without having to provide such a transmission line separately.

Since the matching circuit can be downsized, therefore, the matching circuit can be easily formed in the magnetic head slider with a limited size.

As a seventh feature, in the magnetic head according to the present invention, the capacitor is formed by laminating a plurality of pairs of the first flat plate-like conductor and second flat plate-like conductor.

According to the present invention having the above feature, the capacitor has a laminated structure, so the capacitor formed between the terminal electrode and the microwave magnetic field generating element can have a large capacitance.

Therefore, impedance matching is possible for a microwave signal in a low frequency band as well.

As an eighth feature, in the magnetic head according to the present invention, a transmission line having an inductive component is provided between the terminal electrode and the microwave magnetic field generating element, the transmission line having the inductive component is connected to the first transmission line in parallel to the microwave magnetic field generating element, and the capacitor is connected to the first transmission line in series with the microwave magnetic field generating element between the transmission line having the inductive component and the microwave magnetic field generating element.

According to the present invention having the above feature, the matching circuit is formed in the magnetic head slider by using the transmission line having an inductive component, the transmission line having an inductive component is connected to the first transmission line in parallel to the microwave magnetic field generating element, and the capacitor connected in series with the microwave magnetic field generating element, so a match in impedance can be made between the characteristic impedance obtained when the microwave magnetic field generating element side is viewed from the terminal electrode of the magnetic head slider and the characteristic impedance obtained when the second transmission line side is viewed from the terminal electrode.

As a ninth feature, in the magnetic head according to the present invention, the first transmission line has a first line that extends from an element forming plane of the magnetic head slider in a lamination direction and the capacitor is formed by dividing the first line into a plurality of areas and placing a dielectric body between them.

According to the present invention having the above feature, since the capacitor is formed by using the first line extending from the element forming plane of the magnetic head slider in the lamination direction, the capacitor can be easily formed in the magnetic head slider with a limited size.

As a tenth feature, in the magnetic head according to the present invention, the first transmission line has a second line that extends along an element forming plane of the magnetic head slider, and the capacitor is formed by dividing the second line into a plurality of areas and placing a dielectric body between them.

According to the present invention having the above feature, since the capacitor is formed by using the second line extending along the element forming plane of the magnetic head slider, the capacitor can be easily formed in the magnetic head slider with a limited size.

As an eleventh feature, a head gimbal assembly according to the present invention includes the magnetic head and a suspension that supports the magnetic head slider.

As a twelfth feature, a magnetic recording and reproducing apparatus according to the present invention includes the head gimbal assembly and a magnetic recording medium.

According to the present invention, it is possible to provide a magnetic head, a head gimbal assembly, and a magnetic recording and reproducing apparatus that can efficiently propagate a microwave signal to a microwave magnetic field generating element.

BRIEF DESCRIPTION OF THE DRAWINGS

FIG. 2B is a side view of the head gimbal assembly in the first embodiment.

FIG. 7B is a cross-sectional view illustrating the range from the terminal electrodes to the microwave magnetic field generating element in the magnetic head slider in the first embodiment.

DESCRIPTION OF THE PREFERRED EMBODIMENTS

Preferred embodiments that practice the present invention will be described in detail with reference the drawings. However, the present invention is not restricted by the embodiments described below. Constituent elements described below include constituent elements that a person having ordinary skill in the art can easily assume, constituent elements that are essentially the same as constituent elements that a person having ordinary skill in the art can easily assume, and constituent elements in a range of equivalents to constituent elements that a person having ordinary skill in the art can easily assume. The constituent elements described below can be appropriately combined. The constituent elements can also be omitted, replaced, or changed without departing from the intended scope of the present invention.

First Embodiment

Figure 1:
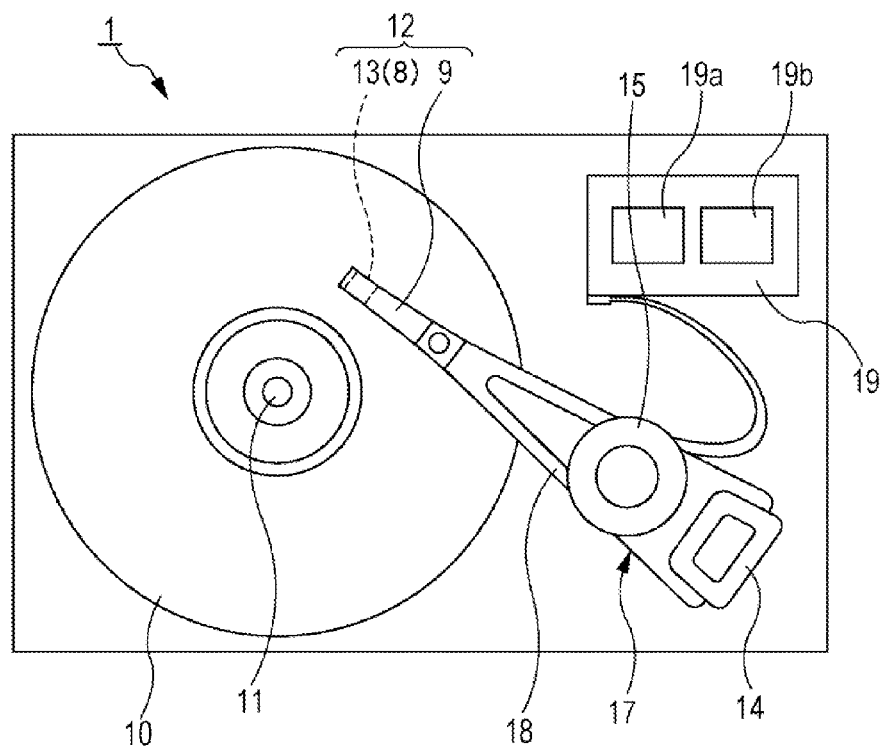
FIG. 1 schematically illustrates a magnetic recording and reproducing apparatus (magnetic disk drive) in a first embodiment.

FIG. 1 schematically illustrates a magnetic recording and reproducing apparatus (magnetic disk drive) 1 in a first embodiment. The magnetic recording and reproducing apparatus 1 has a head gimbal assembly (HGA) 12, which includes a magnetic head 8, and a magnetic recording medium (magnetic disk) 10. There is no limitation on the number of magnetic recording media 10 and the number of head gimbal assemblies 12; a plurality of magnetic recording media 10 and a plurality of head gimbal assemblies 12 may be provided. The magnetic head 8 includes a magnetic head slider 13. The head gimbal assembly 12 includes the magnetic head slider 13 and a suspension 9 that supports the magnetic head slider 13. The magnetic recording medium 10 is rotated by a spindle motor 11 around its rotational axis. The magnetic head slider 13 writes a data signal to the magnetic recording medium 10 and reads out it from the magnetic recording medium 10. The suspension 9 is secured by a driving arm 18, which is rotatable around a pivot bearing axis 15. The suspension 9 uses a voice coil motor (VCM) 14 to position the magnetic head slider 13 on the magnetic recording medium 10. A signal control circuit 19 controls write and read operations of the magnetic head slider 13 and also controls a microwave signal (microwave exciting current) used for strong magnetic resonance. The signal control circuit 19 has a microwave signal generating circuit 19a, which is connected to a second transmission line 22c described later, and a control unit 19b. The microwave generating circuit 19a and control unit 19b may be placed on, for example, the suspension 9; there is no limitation on the place on which the microwave generating circuit 19a and control unit 19b are placed.

Figure 2A:
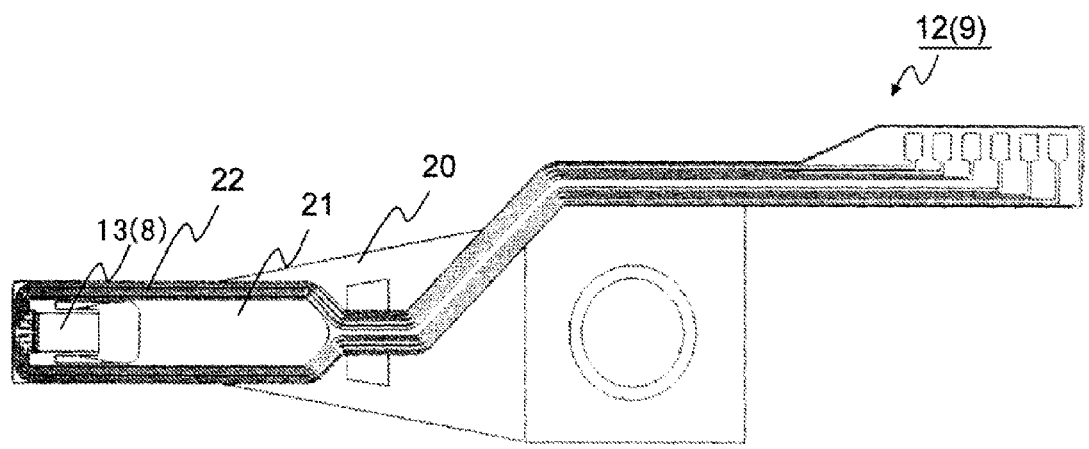
FIG. 2A is a plan view of a head gimbal assembly in the first embodiment.

FIG. 2A is a plan view of the head gimbal assembly 12 in the first embodiment when viewed from the same side as the magnetic recording medium 10, and FIG. 2B is a side view of the head gimbal assembly 12. The suspension 9 has a flexure 21, at one end of which the magnetic head slider 13 is attached, and a load beam 20 that presses the magnetic head slider 13 against the front surface of the magnetic recording medium 10 under a predetermined pressure. The flexure 21, which is elastically deformable, has a gimbal function that enables the magnetic head slider 13 to follow changes on the front surface of the magnetic recording medium 10. Transmission lines 22 are formed on the front surface of the flexure 21. The flexure 21 is linked to the load beam 20. The load beam 20 is connected to the driving arm 18, which positions the magnetic head slider 13 on the magnetic recording medium 10.

Figure 3:
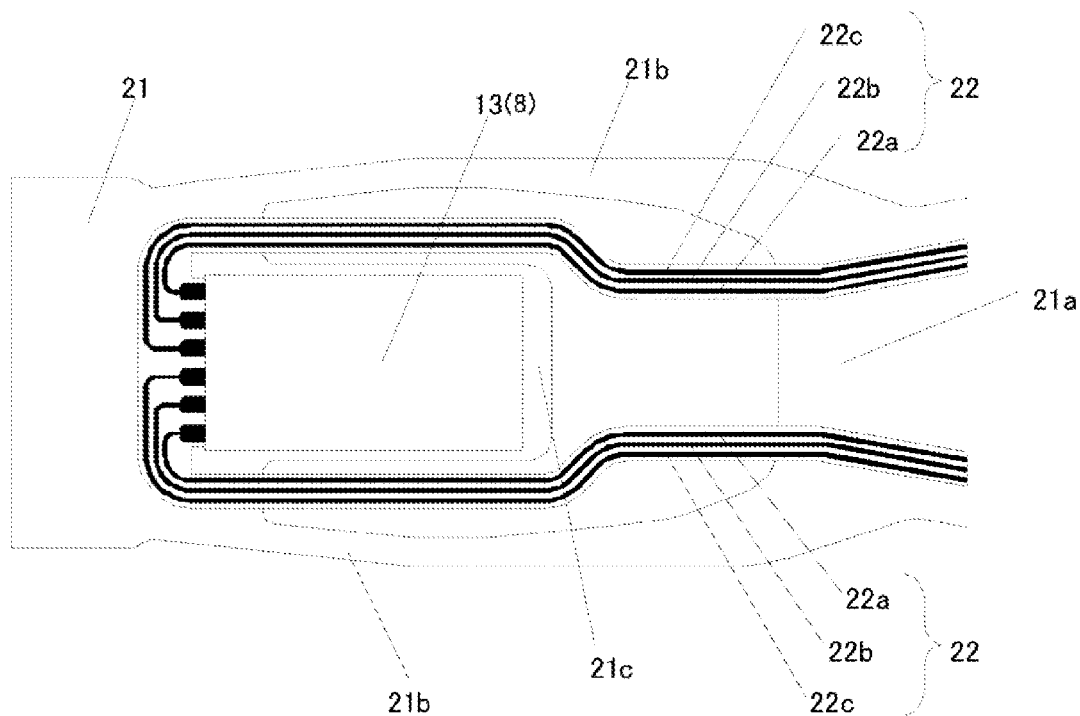
FIG. 3 schematically illustrates the structure of the head gimbal assembly and a magnetic head slider in the first embodiment.

FIG. 3 schematically illustrates the structure of the head gimbal assembly 12 and magnetic head slider 13 in the first embodiment. The structure in the drawing is viewed from the direction A in FIG. 2B. The flexure 21 includes a main body 21a, a support 21c for the magnetic head slider 13, and a linking section 21b, which mutually links the main body 21a and support 21c. The linking section 21b is formed with a pair of arms, which have lower stiffness than the main body 21a and support 21c. As an example, the transmission line 22 includes a recording signal transmission line 22a, through which a recording signal is transmitted to a recording element in the magnetic head slider 13, a reproduced signal transmission line 22b, through which a reproduced output voltage is retrieved from a reproducing element in the magnetic head slider 13, and a second transmission line 22c, which is a microwave signal transmission line through which a microwave signal is transmitted from the outside (microwave generating circuit 19a) of the magnetic head slider 13 to the magnetic head slider 13. The order of the transmission lines 22a to 22c of the transmission line 22 may be changed. The transmission line 22 may include a heater-use transmission line (not illustrated) that is used to adjust an amount by which the magnetic head slider 13 is lifted, and may also include a sensor-use transmission line (not illustrated) that detects the amount of lift. The second transmission line 22c is used to transmit a differential signal. The transmission lines 22a, 22b, and 22c are usually formed with copper.

Figure 4:
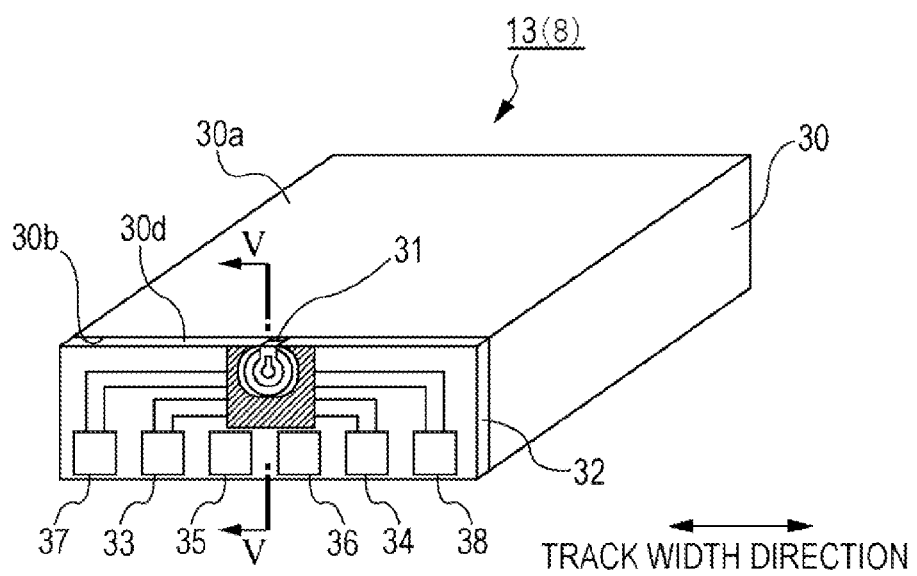
FIG. 4 is a schematic perspective view of the magnetic head slider in the first embodiment.
Figure 5:
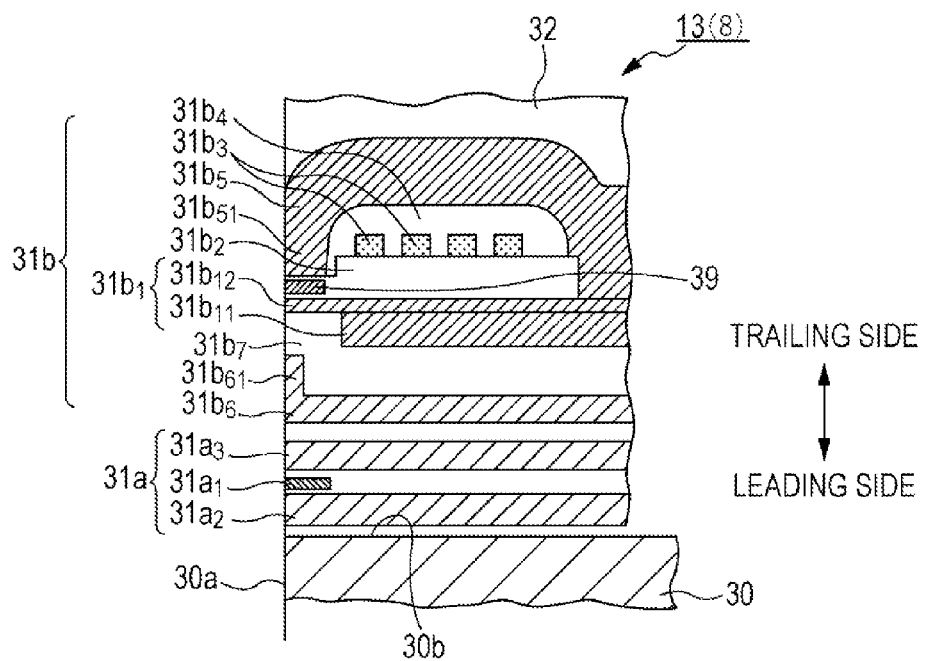
FIG. 5 is a cross-sectional view of the magnetic head slider in the first embodiment.

FIG. 4 is a schematic perspective view of the magnetic head slider 13 in the first embodiment. FIG. 5 is a cross-sectional view of the magnetic head slider 13 in the first embodiment, taken along line V-V in FIG. 4. The magnetic head slider 13 includes a magnetic head slider substrate 30 having an air bearing surface (ABS) 30a, which has been machined so that an appropriate amount of lift is obtained, a head element 31 disposed on an element forming surface 30b perpendicular to the ABS 30a, a protective section 32 disposed on the element forming surface 30b so as to cover the head element 31, and six terminal electrodes 33, 34, 35, 36, 37, and 38 exposed from the surface of the protective section 32. The magnetic head slider substrate 30 is formed with ALTIC ($Al_2O_3$—TiC) or another material. The positions of the terminal electrodes 33, 34, 35, 36, 37, and 38 are not limited to their positions illustrated in FIG. 4; they may be located at any positions on the element forming surface 30b in any array. If a heater (not illustrated) or a sensor (not illustrated) is provided, terminal electrodes that are electrically connected to it are provided.

The head element 31 is formed mainly with a reproducing element 31a, which uses a magneto-resistive effect (MR) to read out a data signal from the magnetic recording medium 10, a recording element 31b, to which a data signal is written by generating a recording signal magnetic field and applying the generated recording signal magnetic field to the magnetic recording medium 10, and a microwave magnetic field generating element 39 that generates a microwave magnetic field and applies the generated microwave magnetic field to the magnetic recording medium 10. The reproducing element 31a, recording element 31b, and microwave magnetic field generating element 39 are formed by laminating films, each of which is an element, on the element forming surface 30b. For example, the terminal electrodes 33 and 34 are electrically connected to the reproducing element 31a, the terminal electrodes 37 and 38 are electrically connected to the recording element 31b, and the terminal electrodes 35 and 36 are electrically connected to the microwave magnetic field generating element 39 through first transmission line 40, which will be described later. There is no limitation on the positions at which these terminals are connected and the array in which they are placed.

For example, the ends of the transmission lines 22a, 22b, and 22c on the same side as the magnetic head slider 13 are respectively connected to the terminal electrodes 37 and 38, the terminal electrodes 33 and 34, and the terminal electrodes 35 and 36 by ball bonding. That is, second transmission line 22c is connected to the terminal electrodes 35 and 36, and microwave signals are supplied from the second transmission line 22c through the terminal electrodes 35 and 36 to the microwave magnetic field generating element 39. The transmission lines 22a, 22b, and 22c may be connected to their relevant terminal electrodes by wire bonding instead of ball bonding. There is no limitation on the method of connection.

An example of the position of the microwave magnetic field generating element 39 in the magnetic head slider 13 will be described with reference to FIG. 5. On the element forming surface 30b of the magnetic head slider substrate 30, the reproducing element 31a, recording element 31b, microwave magnetic field generating element 39, and the protective section 32, which protect these elements, are mainly formed.

The reproducing element 31a includes an MR laminated body 31a1, as well as a lower shield layer 31a2 and an upper shield layer 31a3, between which the MR laminated body 31a1 is disposed. The end of the reproducing element 31a is positioned on the ABS 30a (to be more specific, on the magnetic head slider end face 30d of the ABS 30a). The MR laminated body 31a1 receives a signal magnetic filed from the magnetic recording medium 10. The lower shield layer 31a2 and upper shield layer 31a3 prevent the MR laminated body 31a1 from being affected by an external magnetic field, which would otherwise cause noise to the MR laminated body 31a1.

The recording element 31b is structured for use for perpendicular magnetic recording. Specifically, the recording element 31b has a main magnetic pole layer 31b1, a trailing gap layer 31b2, an auxiliary magnetic pole layer 31b5, a write coil 31b3 formed so as to pass between the main magnetic pole layer 31b1 and the auxiliary magnetic pole layer 31b5, a write coil insulating layer 31b4, an auxiliary shield layer 31b6, and a leading gap layer 31b7. The main magnetic pole layer 31b1 is the main magnetic pole of the recording element 31b. The end of the main magnetic pole layer 31b1 is positioned on the ABS 30a (to be more specific, on the magnetic head slider end face 30d of the ABS 30a). When a data signal is to be written, a recording signal magnetic field is generated from the end of the main magnetic pole layer 31b1 on the same side as the ABS 30a.

The main magnetic pole layer 31b1 is a magnetic guide path through which a magnetic flux generated by applying a write current to the write coil 31b3 is guided to a magnetic recording layer, in which writing is carried out, in the magnetic recording medium 10 while the magnetic flux is being converged. The main magnetic pole layer 31b1 is formed with a main magnetic pole yoke layer 31b11 and a main magnetic pole main layer 31b12.

The auxiliary magnetic pole layer 31b5 is disposed on the trailing side of the main magnetic pole layer 31b1, and the auxiliary shield layer 31b6 is disposed on its leading side. The end of the auxiliary magnetic pole layer 31b5 on the same side as the ABS 30a is a trailing shield portion 31b51 having a wider layer cross-section than other portions of the auxiliary magnetic pole layer 31b5. The end of the auxiliary shield layer 31b6 on the same side as the ABS 30a is a leading shield portion 31b61 having a wider layer cross-section than other portions of the auxiliary shield layer 31b6. The trailing shield portion 31b51 faces the end of the main magnetic pole layer 31b1 on the same side as the ABS 30a with the trailing gap layer 31b2 intervening between them. The leading shield portion 31b61 faces the end of the main magnetic pole layer 31b1 on the same side as the magnetic head slider end face 30d with the trailing gap layer 31b2 intervening between them. Since the trailing shield portion 31b51 and leading shield portion 31b61 as described above are provided, the magnetic field gradient of the recording signal magnetic field between the end of the trailing shield portion 31b51 and the end of the main magnetic pole layer 31b1 and between the end of the leading shield portion 31b61 and the end of the main magnetic pole layer 31b1 becomes steeper.

The microwave magnetic field generating element 39 is formed between, for example, the main magnetic pole main layer 31b12 in the main magnetic pole layer 31b1 and the trailing shield portion 31b51 in the auxiliary magnetic pole layer 31b5. The microwave magnetic field generating element 39 is disposed in the vicinity of the ABS 30a. The microwave magnetic field generating element 39 is formed with a copper material or another conductor. When a microwave signal flows in the microwave magnetic field generating element 39, a microwave magnetic field is generated around the microwave magnetic field generating element 39. An extremely thin coating formed with, for example, diamond-like carbon (DLC) has been applied to the ends of the elements facing the ABS 30a and their vicinity for protective purposes.

Next, microwave assisted recording will be briefly described. The microwave magnetic field generating element 39 is disposed in the vicinity of the ABS 30a and is close to the magnetic recording medium 10, so a microwave magnetic field oriented in an approximately in-plane direction of the magnetic recording medium 10 is applied to the interior of the magnetic recording medium 10. This microwave magnetic field is in a microwave band (1 to 100 GHz, for example) including the strong-magnetization resonant frequency of the magnetic recording layer of the magnetic recording medium 10 or a frequency around the strong-magnetization resonant frequency.

When the microwave magnetic field is applied to the magnetic recording layer of the magnetic recording medium 10, the coercive force of the magnetic recording layer can be reduced. When a recording signal magnetic field is superimposed on the magnetic recording layer from the main magnetic pole layer 31b1 of the recording element 31b, the magnetization of the magnetic recording layer can be efficiently reversed. As a result, the strength of the recording magnetic field in the perpendicular direction, which is needed in writing, can be substantially reduced. To increase the strength of the microwave magnetic field generated from the microwave magnetic field generating element 39, it is desirable for the impedance of the microwave magnetic field generating element 39 to be a substantially short-circuit impedance.

Figure 6:
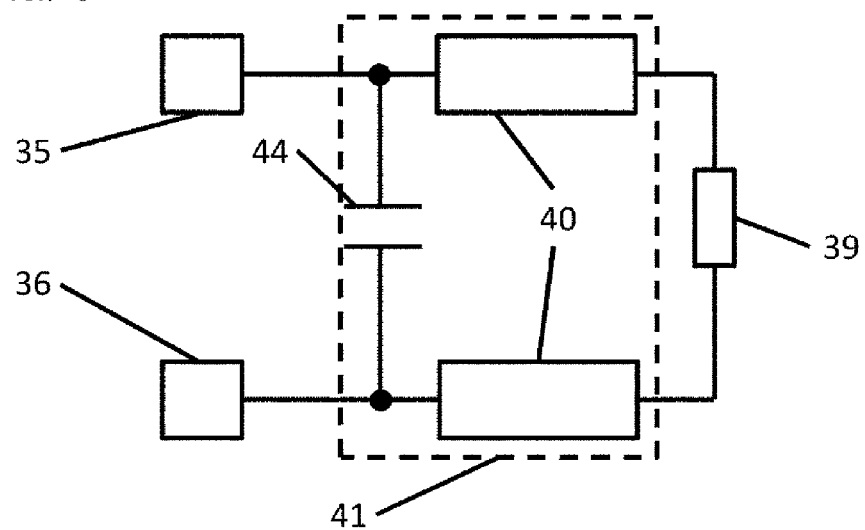
FIG. 6 is a block diagram of a range from terminal electrodes to a microwave magnetic field generating element in the magnetic head slider in the first embodiment.

FIG. 6 is a block diagram of a range from the terminal electrodes 35 and 36 to the microwave magnetic field generating element 39 in the magnetic head slider 13 in FIG. 4, the block including a matching circuit 41. The matching circuit 41 includes the first transmission line 40 and a capacitor 44 connected to the first transmission line 40 in parallel to the microwave magnetic field generating element 39. The terminal electrodes 35 and 36 and microwave magnetic field generating element 39 are interconnected with the first transmission line 40.

Figure 7A:
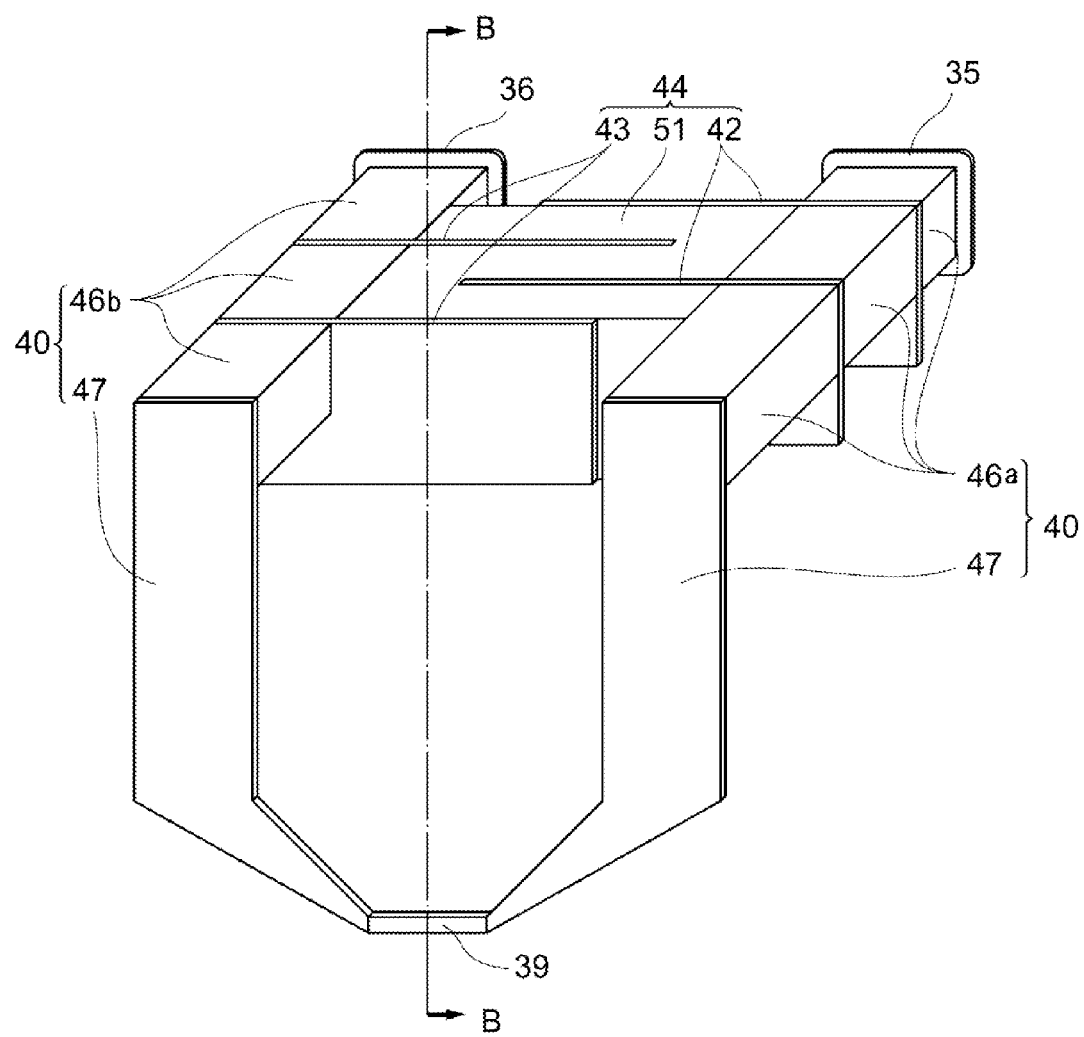
FIG. 7A schematically illustrates the range from the terminal electrodes to the microwave magnetic field generating element in the magnetic head slider in the first embodiment.

FIG. 7A schematically illustrates the range from the terminal electrodes 35 and 36 to the microwave magnetic field generating element 39 in the magnetic head slider 13, and FIG. 7B is a cross-sectional view of the range. As illustrated in FIG. 7A, the magnetic head slider 13 has the first transmission line 40 that interconnects the terminal electrodes 35 and 36 and the microwave magnetic field generating element 39. The first transmission line 40 is a transmission line for use for a differential signal. FIG. 7B is a cross-sectional view as taken along line B-B in FIG. 7A. The first transmission line 40 has two first lines 46a and 46b; these two first lines 46a and 46b extend from the element forming surface 30b of the magnetic head slider 13 in a direction in which the films of the elements formed on the element forming surface 30b are laminated. The first transmission line 40 also has a second line 47 extending toward the ABS 30a along the element forming surface 30b. In FIG. 7B, the first line 46a or 46b and the second line 47 viewed from a direction parallel to the ABS 30a and element forming surface 30b are indicated in an area enclosed by dash-dot-dot lines.

The magnetic head 8 has the capacitor 44 connected to the first transmission line 40 between the terminal electrodes 35 and 36 and the microwave magnetic field generating element 39. The matching circuit 41 is formed with the first transmission line 40 and the capacitor 44, which is formed with a first flat plate-like conductor 42 connected to the first line 46a and a second flat plate-like conductor 43 connected to the first line 46b. The first transmission line 40 has an inductive component. The inductive component of the matching circuit 41 is attributable to the first transmission line 40. A dielectric body 51 is present between the first flat plate-like conductor 42 and the second flat plate-like conductor 43, forming the capacitor 44. The capacitive component of the matching circuit 41 is attributable to the capacitor 44. The first flat plate-like conductor 42 and second flat plate-like conductor 43 are laminated on the element forming surface 30b of the magnetic head slider 13. The first flat plate-like conductor 42 and second flat plate-like conductor 43 are connected directly to the first transmission line 40. A plurality of pairs of the first flat plate-like conductor 42 and second flat plate-like conductor 43 are laminated.

Although the second line 47 extends toward the ABS 30a along the element forming surface 30b as an example, if the first lines 46a and 46b are formed in the vicinity of the ABS 30a, the second lines 47 may not extend toward the ABS 30a. The second lines 47 may be omitted by directly connecting the microwave magnetic field generating element 39 to the first lines 46a and 46b.

Next, the effect of the magnetic head 8 will be described.

The magnetic head 8 has the capacitor 44 connected to the first transmission line 40 between the terminal electrodes 35 and 36 and the microwave magnetic field generating element 39, so the matching circuit 41 is formed in the magnetic head slider 13, enabling a match in impedance to be made between the characteristic impedance obtained when the same side as the microwave magnetic field generating element 39 is viewed from the terminal electrodes 35 and 36 of the magnetic head slider 13 and the characteristic impedance obtained when the same side as the second transmission line 22c is viewed from the terminal electrodes 35 and 36. Therefore, it is possible to suppress a microwave signal entered from the second transmission line 22c from being reflected at the terminal electrodes 35 and 36 in the magnetic head slider 13, so the microwave signal can be efficiently propagated to the microwave magnetic field generating element 39.

Since, in the magnetic head 8, the first transmission line 40 and second transmission line 22c are each a transmission line for use for a differential signal, the characteristic impedances of the first transmission line 40 and second transmission line 22c are less likely to be affected by the outside of the transmission lines. In the magnetic head slider 13 in which the first transmission line 40 is disposed and on the suspension 9 on which the second transmission line 22c is disposed, for example, there is a ground layer made of stainless steel or the like in some portions below the first transmission line 40 and second transmission line 22c and there is no such a ground layer in other portions. If, therefore, the first transmission line 40 and second transmission line 22c are each a transmission line with a single-end structure, the characteristic impedance largely changes depending on the presence or absence of a ground layer. Since the first transmission line 40 and second transmission line 22c are each a transmission line for use for a differential signal, however, they are less likely affected by the presence or absence of a ground layer. Therefore, the characteristic impedances of these transmission lines for use for a differential signal less change, and the transmission loss in a microwave signal can thereby be more reduced.

The capacitor 44 connected in parallel to the microwave magnetic field generating element 39 does not generate a capacitive component that cancels the inductive component of the first transmission line 40, so it is possible to further downsize the capacitor 44.

Since, in the magnetic head 8, the inductive component of the matching circuit 41 is attributable to the first transmission line 40, there is no need to add another element having an inductive component to the interior of the matching circuit 41, so the matching circuit 41 can be downsized. This enables the matching circuit 41 to be easily formed in the magnetic head slider 13 with a limited size.

In the magnetic head 8, the first transmission line 40 has the two first lines 46a and 46b, which extend from the element forming surface 30b of the magnetic head slider 13 in the lamination direction, and the capacitor 44 is formed with the first flat plate-like conductor 42 connected to the first line 46a, the second flat plate-like conductor 43 connected to the first line 46b, and the dielectric body 51 disposed between the first flat plate-like conductor 42 and the second flat plate-like conductor 43. Therefore, the capacitor 44 defined between the first flat plate-like conductor 42 and the second flat plate-like conductor 43 can be easily formed in the magnetic head slider 13 with a limited size.

If another transmission line different from the first transmission line 40 is provided to add an element having a capacitive component, a parasitic inductive component that cancels the capacitive component is generated, so an element having a large capacitive component is needed. This enlarges an element having a capacitive component and thereby enlarges the matching circuit 41. In the magnetic head 8, however, at least one of the first flat plate-like conductor 42 and second flat plate-like conductor 43 is connected directly to the first line 46a or 46b, whichever is applicable, so the matching circuit 41 can have a capacitive component without having to provide such a transmission line separately, and the matching circuit 41 can thereby be downsized. This enables the matching circuit 41 to be easily formed in the magnetic head slider 13 with a limited size.

The magnetic head 8 has the capacitor 44, in which a plurality of pairs of the first flat plate-like conductor 42 and second flat plate-like conductor 43 are laminated, so the capacitor 44 formed between the terminal electrodes 35 and 36 and the microwave magnetic field generating element 39 can have a large capacitance. Therefore, impedance matching is possible for a microwave signal in a low frequency band as well.

Second Embodiment

A second embodiment will be described below only for structures different from the first embodiment above. Specifically, as illustrated in the block diagram in FIG. 8 that covers a range from the terminal electrodes 35 and 36 to the microwave magnetic field generating element 39 in the magnetic head slider 13 and in the schematic diagram in FIG. 9 that covers the range from the terminal electrodes 35 and 36 to the microwave magnetic field generating element 39 in the magnetic head slider 13, the first flat plate-like conductor 42 and second flat plate-like conductor 43, which are connected in parallel to the microwave magnetic field generating element 39, are respectively connected to the first lines 46a and 46b through a transmission line 45 having an inductive component, and the first flat plate-like conductor 42, the second flat plate-like conductor 43, and the dielectric body 51 disposed between them form a capacitor 44b.

Figure 8:
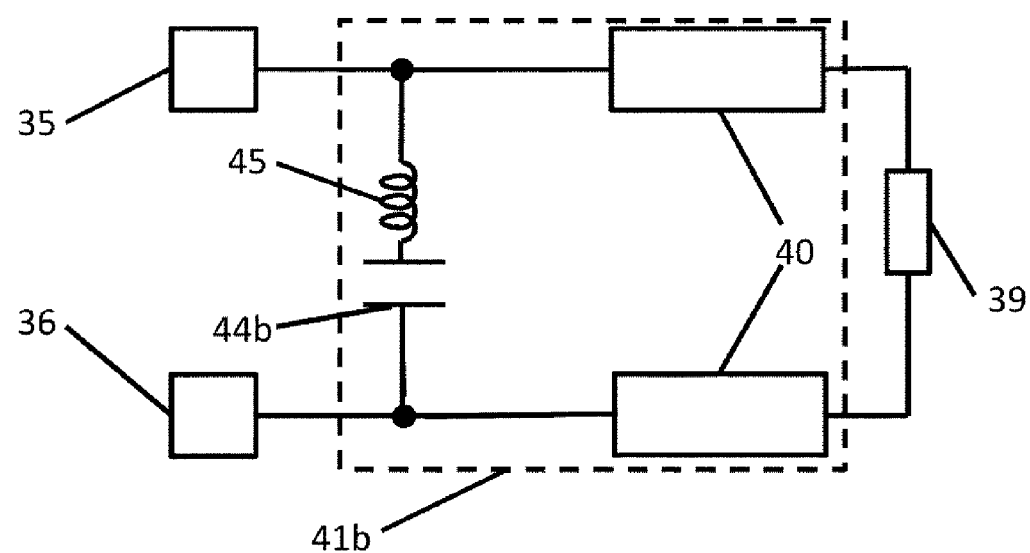
FIG. 8 is a block diagram of a range from terminal electrodes to a microwave magnetic field generating element in a magnetic head slider in a second embodiment.
Figure 9:
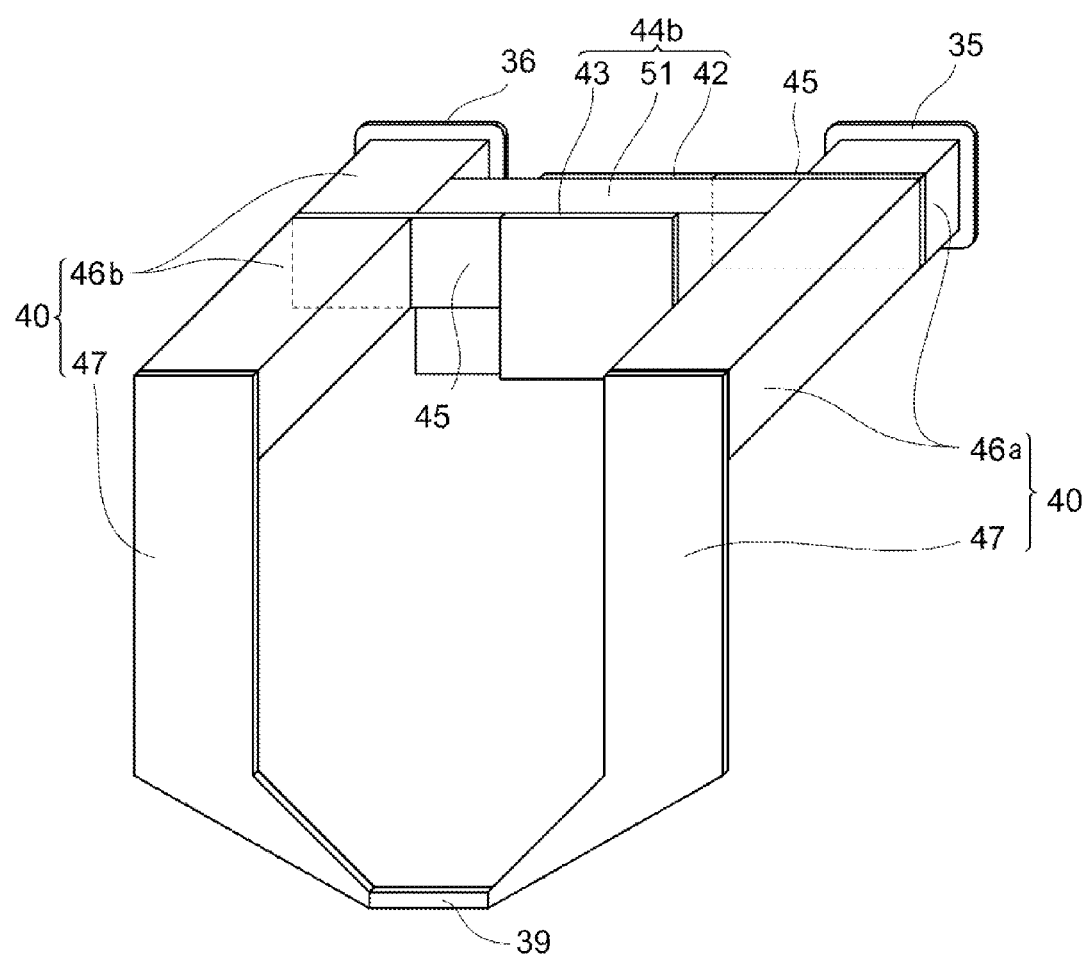
FIG. 9 schematically illustrates the range from the terminal electrodes to the microwave magnetic field generating element in the magnetic head slider in the second embodiment.

In the magnetic head 8 in the second embodiment, the first flat plate-like conductor 42 and second flat plate-like conductor 43 are connected to the first transmission line 40 through the transmission line 45 having an inductive component, forming a matching circuit 41b with a structure that includes the capacitor 44b and the transmission line 45 having an inductive component. In this case, a series resonant circuit as illustrated in FIG. 8 is formed by the inductive component of the transmission line 45 and the capacitive component of the capacitor 44b, enabling an unnecessary frequency component, such as, for example, a harmonic component, to be released to the series resonant circuit. Therefore, only a microwave signal at a desired frequency can be efficiently propagated to the microwave magnetic field generating element 39.

Although, in the second embodiment, the first flat plate-like conductor 42 and second flat plate-like conductor 43 are respectively connected to the first lines 46a and 46b through the transmission line 45 having an inductive component, one of the first flat plate-like conductor 42 and second flat plate-like conductor 43 may be connected directly to the first line 46a or 46b, whichever is applicable, and other may be connected to the other of the first lines 46a and 46b through the transmission line 45 having an inductive component. Although, in FIG. 9, one first flat plate-like conductor 42 and one second flat plate-like conductor 43 are illustrated as an example, a plurality of pairs of the first flat plate-like conductor 42 and second flat plate-like conductor 43 may be laminated.

Third Embodiment

Figure 10:
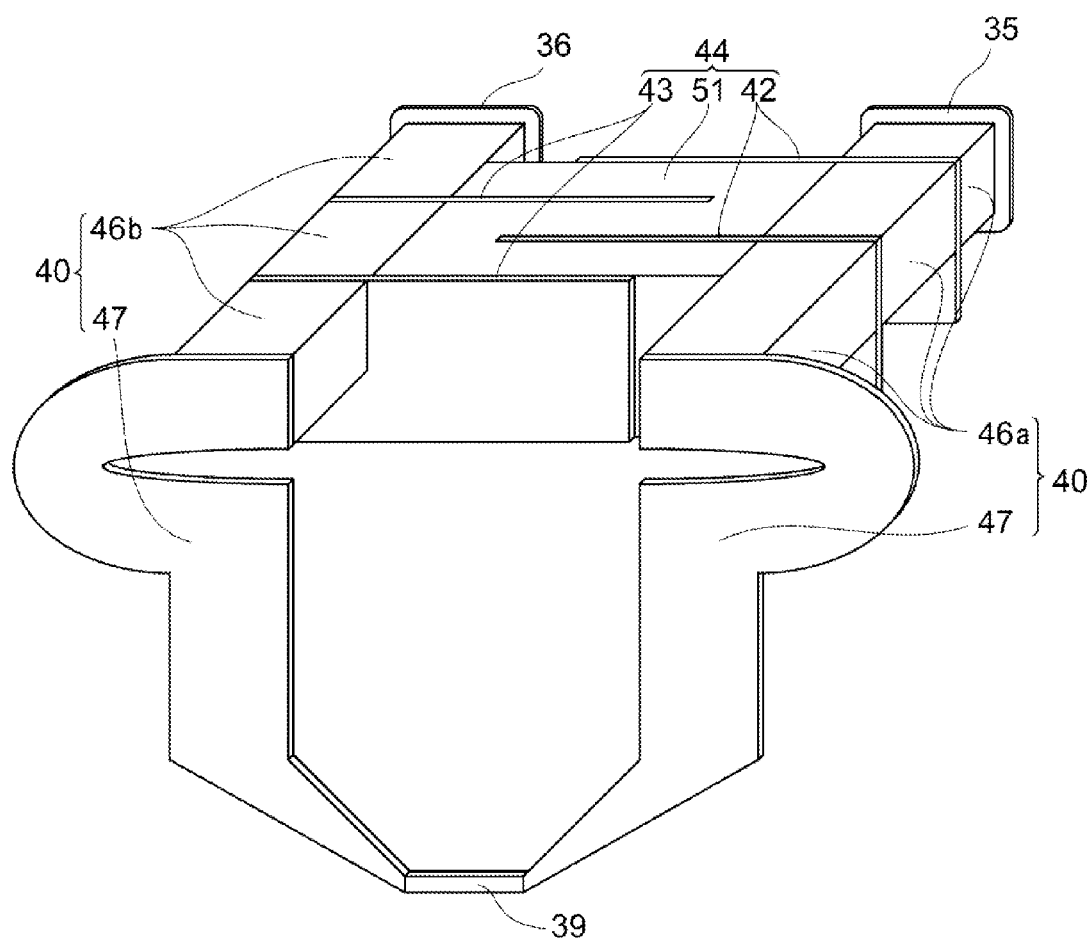
FIG. 10 schematically illustrates a range from terminal electrodes to a microwave magnetic field generating element in a magnetic head slider in a third embodiment.

A third embodiment will be described below only for structures different from the first embodiment above. Specifically, as illustrated in the schematic diagram in FIG. 10 that covers a range from the terminal electrodes 35 and 36 to the microwave magnetic field generating element 39 in the magnetic head slider 13, the first transmission line 40 that interconnects the microwave magnetic field generating element 39 and the terminal electrodes 35 and 36 are longer than in the first embodiment. This enables the inductive component of the first transmission line 40 to be larger than in the first embodiment.

When the length of the first transmission line 40 is changed as described above, it is possible to suppress a microwave signal entered from the second transmission line 22c from being reflected at the terminal electrodes 35 and 36 in the magnetic head slider 13 by adjusting the inductive component of the matching circuit 41 to make a match in the characteristic impedance, enabling the microwave signal to be efficiently to be propagated to the microwave magnetic field generating element 39.

Fourth Embodiment

A fourth embodiment will be described below only for structures different from the first embodiment above. Specifically, as illustrated in the block diagram in FIG. 11 that covers a range from the terminal electrodes 35 and 36 to the microwave magnetic field generating element 39 in the magnetic head slider 13 and in the schematic diagrams in FIGS. 12 and 13 that covers the range from the terminal electrodes 35 and 36 to the microwave magnetic field generating element 39 in the magnetic head slider 13, a transmission line 49 having an inductive component is connected to the first transmission line 40 in parallel to the microwave magnetic field generating element 39 between the terminal electrodes 35 and 36 and the microwave magnetic field generating element 39. Capacitors 48 and 54 are connected to the first transmission line 40 in series with the microwave magnetic field generating element 39 between the microwave magnetic field generating element 39 and the transmission line 49 having an inductive component. The transmission lines 49 having an inductive component is preferably a thin-film conductive pattern in a meander line shape as in, for example, FIG. 12 so as to have an inductive component. The shape of the transmission line 49 may be a spiral inductor shape. If a necessary component is obtained, the transmission line 49 may be linear.

Thus, a matching circuit 41c is formed, which includes the transmission line 49 having an inductive component and is connected to first transmission line 40 in parallel to the microwave magnetic field generating element 39 and also includes the capacitors 48 and 54 that are connected to the first transmission line 40 in series with the microwave magnetic field generating element 39 between the transmission line 49 and the microwave magnetic field generating element 39. By use of the matching circuit 41c having a structure different from the first embodiment, a match can be made between the characteristic impedance obtained when the same side as the microwave magnetic field generating element 39 is viewed from the terminal electrodes 35 and 36 of the magnetic head slider 13 and the characteristic impedance obtained when the same side as the second transmission line 22c is viewed from the terminal electrodes 35 and 36.

Figure 11:
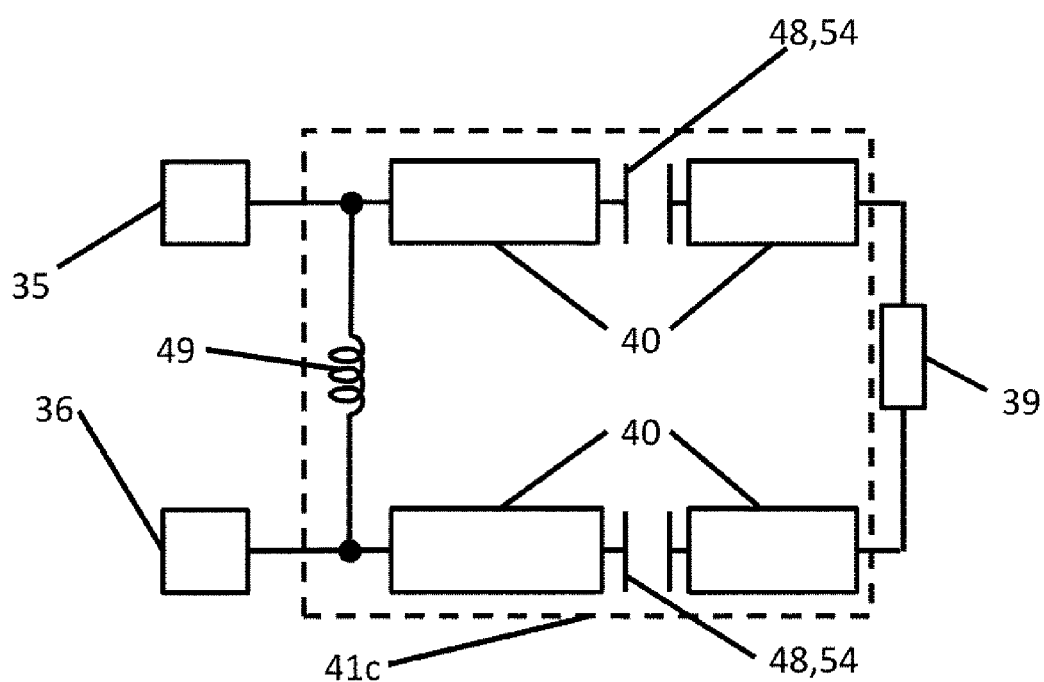
FIG. 11 is a block diagram of a range from terminal electrodes to a microwave magnetic field generating element in a magnetic head slider in a fourth embodiment.
Figure 12:
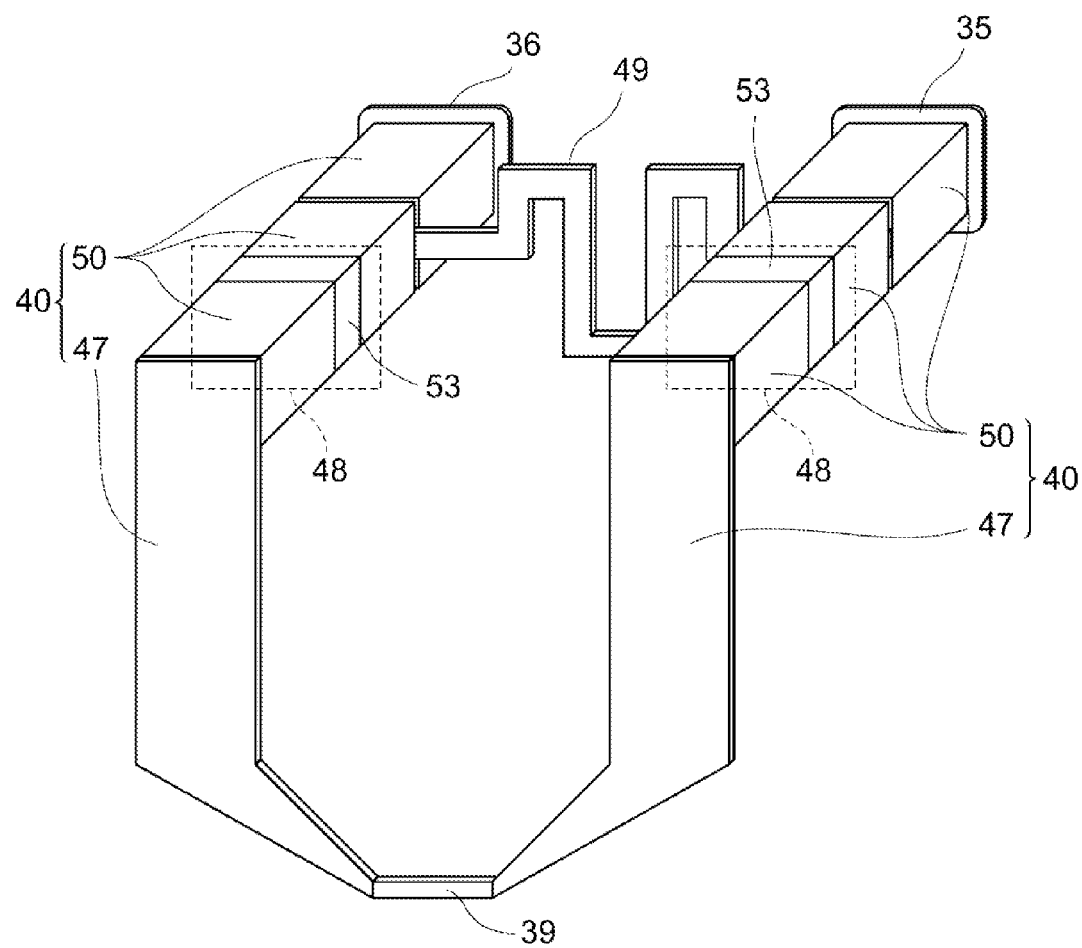
FIG. 12 schematically illustrates the range from the terminal electrodes to the microwave magnetic field generating element in the magnetic head slider in the fourth embodiment.
Figure 13:
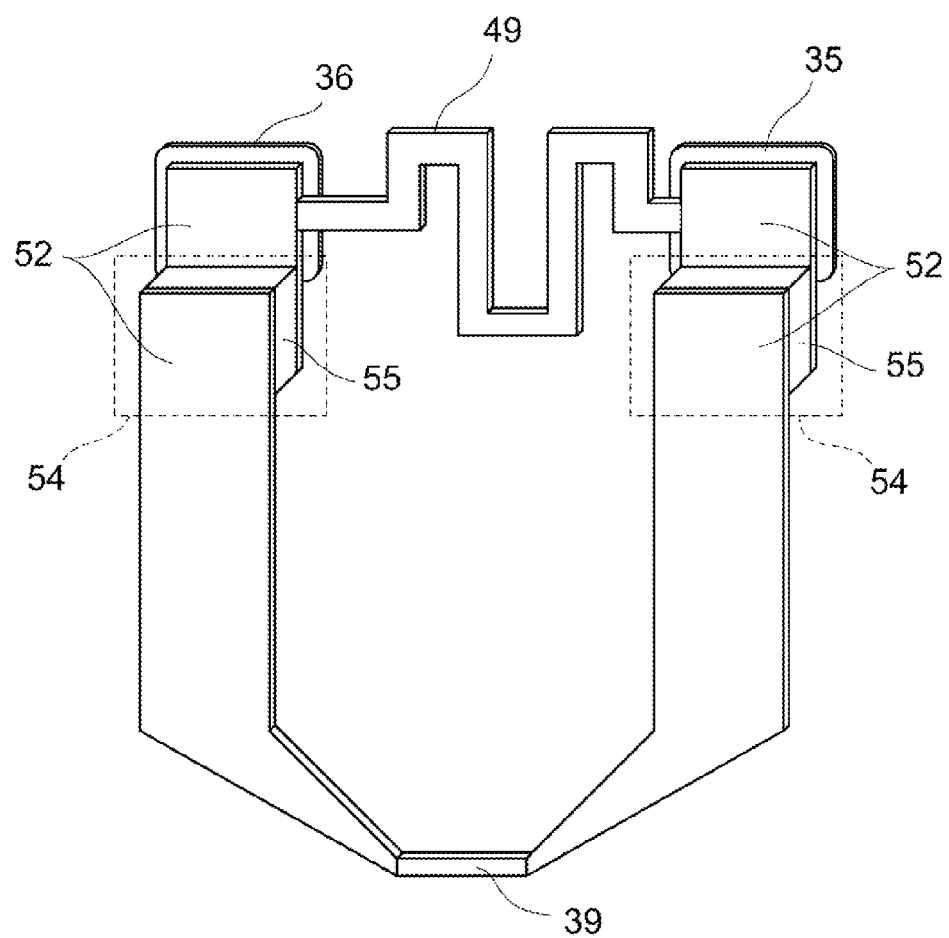
FIG. 13 schematically illustrates a range from terminal electrodes to a microwave magnetic field generating element in a magnetic head slider in another example in the fourth embodiment.

The forms illustrated in the schematic drawings in FIGS. 12 and 13 have the same circuit structure as illustrated in the block diagram in FIG. 11. In the form in FIG. 12, however, the first transmission line 40 has the second line 47, which extends toward the ABS 30a along the element forming surface 30b in the magnetic head slider 13, and a first line 50, which extends from the element forming surface 30b in the lamination direction, and, in the capacitor 48, the first line 50 is divided into a plurality of areas in the lamination direction, between which the dielectric body 53 is present. Since the capacitor 48 is formed by using first line 50 extending from the element forming surface 30b in the lamination direction, the capacitor 48 can be easily formed in the magnetic head slider 13 with a limited size.

If the first line 50 is formed in the vicinity of the ABS 30a, the second line 47 may not extend toward the ABS 30a. The second line 47 may be omitted by directly connecting the microwave magnetic field generating element 39 to the first line 50.

In the form in FIG. 13, the first transmission line 40 has a second line 52, which extends toward the ABS 30a along the element forming surface 30b in the magnetic head slider 13 and the capacitor 54 is formed by dividing the second line 52 into a plurality of areas in the lamination direction and placing a dielectric body 55 between them. Since the capacitor 54 is formed by using the second line 52 extending along the element forming surface 30b, the capacitor 54 can be easily formed in the magnetic head slider 13 with a limited size.

Example

Figure 14:
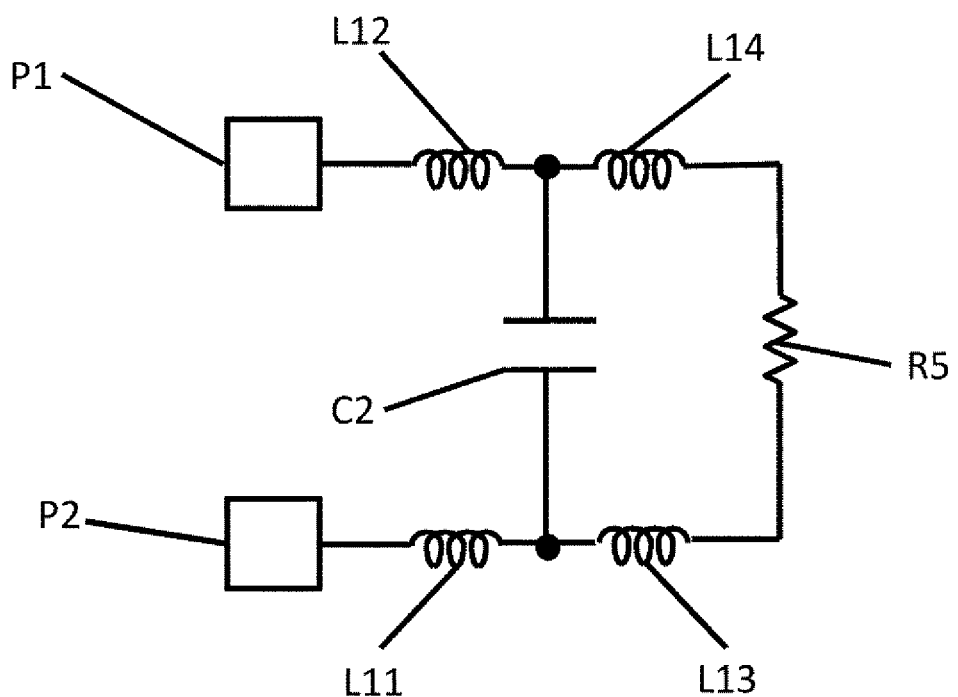
FIG. 14 illustrates an equivalent circuit for the range from the terminal electrodes to the microwave magnetic field generating element in the magnetic head slider in the first embodiment.
Figure 15:
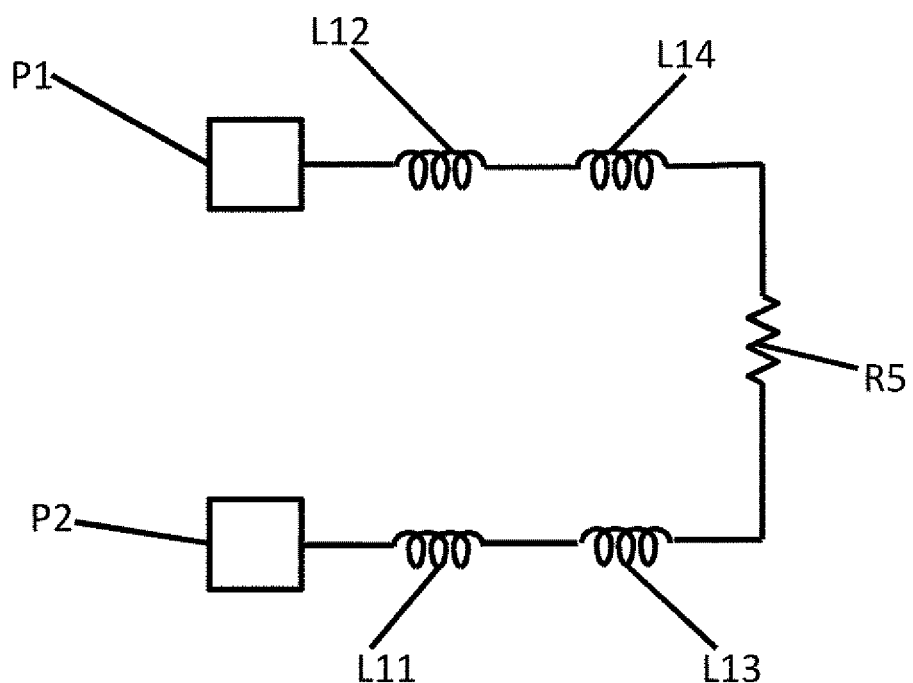
FIG. 15 illustrates an equivalent circuit for a range from terminal electrodes to a microwave magnetic field generating element in a magnetic head slider in a comparative example.

In the magnetic head 8 according to the first embodiment described above, a reflection loss (S11) from the second transmission line 22c to the terminal electrodes 35 and 36 was calculated by using Advanced Design System (ADS), which is circuit simulation software available from Agilent Technologies. FIG. 14 illustrates an equivalent circuit in the first embodiment, and FIG. 15 illustrates an equivalent circuit in a comparative example. In these equivalent circuits, P1 and P2 respectively indicate the terminal electrodes 35 and 36, R5 indicates the microwave magnetic field generating element 39, L11 to L14 indicate the first transmission line 40, and C2 indicates the capacitor 44. A magnetic head in the comparative example is identical to the magnetic head 8 but the capacitor 44 is not present. The comparative example lacks C2 as indicated in FIG. 15.

Table 1 indicates the values of the capacitance of C2 and the inductance of L11 to L14 when a match in impedance is made at microwave signal frequencies of 5, 10, 20, and 30 GHz. Table 2 indicates comparison results in reflection loss (S11) at these frequencies between the example and the comparative example. The values of the inductance of L11 to L14 in the example were used as the values of the inductance of L11 to L14 in the comparative example.

TABLE 1

| | Frequency | | | |
|---|---|---|---|---|
| | 5 GHz | 10 GHz | 20 GHz | 30 GHz |
| C2 | 2.00 pF | 1.01 pF | 0.54 pF | 0.50 pF |
| L11, L12 | 0.25 nH | 0.13 nH | 0.06 nH | 0.03 nH |
| L13, L14 | 0.10 nH | 0.34 nH | 0.3 nH | 0.08 nH |
| S11 | −26.52 dB | −24.58 dB | −23.07 dB | −11.74 dB |

TABLE 2

| | Frequency | | | |
|---|---|---|---|---|
| | 5 GHz | 10 GHz | 20 GHz | 30 GHz |
| Example | −26.52 dB | −24.58 dB | −23.07 dB | −11.74 dB |
| Comparative example | −0.61 dB | −0.53 dB | −0.35 dB | −0.27 dB |

In Tables 1 and 2, the reflection loss (S11) is represented as a ratio of the input electric power of a microwave signal entered from the second transmission line 22c into the terminal electrodes 35 and 36 to reflected electric power in decibel (dB). If a loss generated in the microwave signal due to reflection at the terminal electrodes 35 and 36 is small, the value of the reflection loss (S11) becomes large in the negative direction. If the loss due to reflection at the terminal electrodes 35 and 36 is large, the reflection loss (S11) approaches 0.

In the comparative example, a match in impedance was not be obtained. As indicated in Table 2, therefore, the value of S11 was close to 0 dB at all frequencies, and about 90% or more of the electric power of the microwave signal entered into the terminal electrodes 35 and 36 was reflected at the terminal electrodes 35 and 36, so the microwave signal could not be efficiently supplied to the microwave magnetic field generating element 39.

In the example, a match in impedance was obtained by optimizing the inductive component of the first transmission line 40 and the capacitive component of the capacitor 44 according to the frequency, so S11 was −10 dB or less at all frequencies, so the microwave signal could be efficiently propagated to the microwave magnetic field generating element 39. In general, when S11 is −10 dB or less, about 90% or more of the electric power of a microwave signal entered into the terminal electrodes 35 and 36 efficiently flows to the microwave magnetic field generating element 39.

What is claimed is:

1. A magnetic head, comprising:
a magnetic head slider having:
a recording element that generates a recording signal magnetic field;
a microwave magnetic field generating element that generates a microwave magnetic field;
a terminal electrode; and
a first transmission line that interconnects the terminal electrode and the microwave magnetic field generating element, the first transmission line having two first lines that extend from an element forming plane of the magnetic head slider in a lamination direction;
a second transmission line connected to the terminal electrode, the second transmission line being used to transmit a microwave signal from an outside of the magnetic head slider to the magnetic head slider; and
a capacitor connected to the first transmission line provided between the terminal electrode and the microwave magnetic field generating element, the capacitor being formed with a first flat plate-like conductor connected to one of the first lines, a second flat plate-like conductor connected to another of the first lines, and a dielectric body disposed between the first flat plate-like conductor and the second flat plate-like conductor.

2. The magnetic head according to claim 1, wherein each of the first transmission line and the second transmission line is a transmission line for use for a differential signal.

3. The magnetic head according to claim 1, wherein the capacitor is connected to the first transmission line in parallel to the microwave magnetic field generating element.

4. The magnetic head according to claim 1, wherein the first transmission line has an inductive component.

5. The magnetic head according to claim 1, wherein at least one of the first flat plate-like conductor and the second flat plate-like conductor is connected directly to one of the first lines.

6. The magnetic head according to claim 1, wherein the capacitor is formed by laminating a plurality of pairs of the first flat plate-like conductor and the second flat plate-like conductor.

7. A head gimbal assembly, comprising:
the magnetic head according to claim 1; and
a suspension that supports the magnetic head slider according to claim 1.

8. A magnetic recording and reproducing apparatus comprising:
the head gimbal assembly according to claim 7; and
a magnetic recording medium.

* * * * *